United States Patent [19]
Loftis et al.

[11] Patent Number: 5,384,813
[45] Date of Patent: Jan. 24, 1995

[54] HIGHLY DAMPED STORAGE RACK FOR NUCLEAR FUEL ASSEMBLIES

[75] Inventors: Joseph M. Loftis, Pittsburgh; William J. Wachter, Wexford, both of Pa.

[73] Assignee: Ionics, Inc., Watertown, Mass.

[21] Appl. No.: 27,088

[22] Filed: Mar. 5, 1993

[51] Int. Cl.$^6$ ............................................. G21C 19/40
[52] U.S. Cl. ............................................................ 376/272
[58] Field of Search ........................... 376/272, 285; 250/506.1, 507.1

[56] References Cited

U.S. PATENT DOCUMENTS

| | | | |
|---|---|---|---|
| 4,010,375 | 3/1977 | Wachter et al. | 376/272 |
| 4,029,968 | 6/1977 | Rubinstein et al. | 376/272 |
| 4,034,227 | 7/1977 | Soot | 376/272 |
| 4,177,386 | 12/1979 | Wachter et al. | 376/272 |
| 4,366,115 | 12/1982 | Schlumpf | 376/272 |
| 4,400,344 | 8/1983 | Wachter et al. | 376/272 |
| 4,695,424 | 9/1987 | Flynn | 376/272 |
| 4,746,487 | 5/1988 | Wachter | 376/272 |
| 4,857,263 | 8/1989 | Machado et al. | 376/272 |
| 4,889,681 | 12/1989 | Wachter et al. | 376/272 |
| 4,948,553 | 8/1990 | Machado et al. | 376/272 |
| 4,960,559 | 10/1990 | Fogg | 376/261 |
| 4,960,560 | 10/1990 | Machado et al. | 376/272 |

OTHER PUBLICATIONS

Citations from the Enegy Science and Technology Database by NERAC, Mar. 14, 1992.

*Primary Examiner*—Daniel D. Wasil
*Attorney, Agent, or Firm*—Lappin & Kusmer

[57] ABSTRACT

A storage rack for storing nuclear fuel rod assemblies is provided with an array of cell housings having damping elements which are preloaded against the outer walls of the individual cells. The damping elements are slabs which when preloaded against the cell walls provide a coulomb damping function which is highly effective in absorbing vibration from rough handling or seismic events. The cell housings may be located in alternating positions in the array and cells may be formed from the outer walls of the surrounding cell housings. The cell housings are held together in the array by support bars which are affixed to the top and bottom ends of the cell housings. The support bars may include recesses to align the cell housings.

42 Claims, 11 Drawing Sheets

HIGHLY DAMPED STORAGE RACK FOR NUCLEAR FUEL ASSEMBLIES

BACKGROUND OF THE INVENTION

The invention relates to storage racks for storing nuclear fuel assemblies both during transport and during stationary storage. Preferably, the racks are highly overdamped, enabling them to best withstand vibrations caused by seismic events or rough handling.

Fuel for nuclear reactors is typically configured in the form of elongated fuel rods, which may be separate, stand-alone elements, or may be positioned within canisters. Hereinafter, the fuel rods and rod/canister combinations are referred to as fuel assemblies. Both before and following use, the fuel assemblies must be stored and/or transported with great care. To assure that such care is achieved, storage racks are often used to support a plurality of fuel assemblies in a generally parallel, spaced-apart configuration, while maintaining the fuel assemblies in a subcritical array environment. During storage, the racks and the fuel assemblies contained therein, may be completely submerged in a pool of water. The water provides cooling and additional shielding from nuclear radiation.

The fuel storage racks of the prior art typically consist of an assembly of hollow cells, each defined by an array of elongated rectangular cross-section boxes or compartments. The boxes are typically made by forming sheets of stainless steel into elongated rectangular cross-section tubes and welding the corners of the elongated tubes together to form a matrix of elongated hollow cells, each adapted the receive a single fuel assembly. Exemplary storage racks are disclosed in U.S. Pat. Nos. 4,695,424, 4,857,263, 4,948,553, and 4,366,115. A neutron absorbing (or "poison") material, such as borated stainless steel, is typically welded or otherwise rigidly affixed to each of the walls of boxes to absorb neutron flux from the fuel assemblies which may be positioned within the boxes, thereby avoiding an undesirable concentration of neutrons.

These prior art storage racks suffer from several disadvantages. For example, neutron absorbing elements, and particularly those made borated stainless steel, are expensive and difficult to form and weld to the walls of the boxes. Further, the individual cells are known to be weak along the top edge and have little torsional or crush strength. In addition, storage racks constructed in this way have little resistance to vibration, such as may be caused by seismic events. Due to the reactive nature of the nuclear fuel assemblies, such damage to the storage racks can be disastrous.

Accordingly, it is an object of the present invention to provide an improved storage and/or transport rack for nuclear fuel assemblies.

Another object of the present invention is to provide an improved storage rack for nuclear fuel assemblies which is highly overdamped to enable the rack to withstand the vibration of seismic events or rough handling such as may be encountered during transportation of the rack.

It is another object to provide a storage rack for nuclear fuel assemblies which has improved torsional and crush strength.

A further object is to provide an improved storage rack for nuclear fuel assemblies which may De easily and inexpensively manufactured.

Other objects of the invention will in part be obvious and will in part appear hereinafter.

SUMMARY OF THE INVENTION

According to the present invention, a rack structure is provided for long term storage and/or transport of nuclear fuel assemblies. The storage rack includes an array of individual storage cells. The cells of the array are defined by a plurality of substantially polygonal cross-section, elongated cell housings, each extending along an elongated central axis, wherein the central axes are substantially parallel to each other. In accord with an important aspect of the invention, a slab of neutron absorbing (or "poison") material is biased against the outer surfaces of the cell housings. Preferably, the cell housings are positioned in alternate points of a rectangular grid configuration, so that each cell housing defines one cell in its interior and so that the outer walls of three or more adjacent cell housings define one cell. A stiffener wall may be welded to the adjacent cell housings along the perimeter of the rack to enclose the open cells along the perimeter. The cell housings and the stiffener walls are held in parallel alignment by support bars affixed thereto, for example by welding, at both the top and bottom ends of the array of cell housings. Preferably, the support bars are positioned at the top and bottom ends between each row of cell housings and along the outer perimeter of the rack. The support bars may be recessed on one side or on alternating sides to provide positioning of the cell housings prior to affixation. A base plate is affixed to bottom of the array to define the lower boundary of the respective cells and to support the fuel assemblies therein. To facilitate water flow for cooling of the nuclear fuel assemblies, the base plate may include holes at positions within each cell. Pedestals extending from the base plate may be used to raise the rack above a floor.

With this configuration, a new or spent fuel assembly may be placed in each of the cells. When in place, neutron flux from the fuel assemblies is absorbed by the poison material on the cell housing walls. Retaining devices, or clamp assemblies, hold the poison slabs in position, while preloading (i.e. forcing) the slabs against the walls, and permit easy assembly of the rack without requiring welding of the poison material to the housings.

The retaining devices press the slabs firmly against the walls of the cell housings. The resulting friction between the slab and cell walls results in a coulomb damping function that has proven extremely effective in deadening vibration. The slabs also serve to strengthen the cell walls making them more resistant to deformation or "oil canning". Thus, the slabs, as held in place by the preload forces, preferably establish an overdamped characteristic for the cell housings, resulting in a substantially stronger, vibration resistant configuration as compared with the prior art. In the preferred form of the invention the slabs, which are preloaded against the cell walls, are made of a neutron absorbing material. Alternatively, the invention may be configured with other materials that are preloaded against the cell walls, which merely provide the coulomb damping function. In the latter configurations, other forms of neutron absorption may or may not be used.

Alternatively, the retaining device may include a single cover plate which extends over and protects the entire poison slab. The cover plate is provided with flanges along the perimeter which are fixed to the housing to preload or force the slab against the outer surface. Additionally, the cover plate may be provided with raised bumps or ridges which bear on the poison slab and further preload it against the housing in a substantially uniform manner.

In view of the potential danger inherent in handling and storing nuclear fuel assemblies, it is critical that the storage racks effectively isolate and support the nuclear fuel assemblies under adverse conditions. In use, the racks are subject to stresses resulting from normal insertion and removal of the nuclear fuel assemblies, rough handling during transportation of the rack and possibly natural phenomena such as an earthquake. By providing the rack with a highly overdamped characteristic, it is better able to withstand these stresses and insure long term stability, as compared to prior art racks.

Typically, in prior art storage racks, individual cells are welded together at the corners of their respective cell housings. This method has proven to be undesirable not only because is it difficult and therefore expensive to manufacture but also because it has proven to be structurally inferior. In contrast, by welding the cell housings to support bars at the top and bottom of the rack, and with little or no other cell-to-cell fixation, the present invention avoids both the difficulty and expense of the prior art process and provides improved torsion and crush strength. The support bars also reinforce the upper edges of the cell housing to protect them from damage during normal insertion and removal of the nuclear fuel assemblies.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

Figure 1:
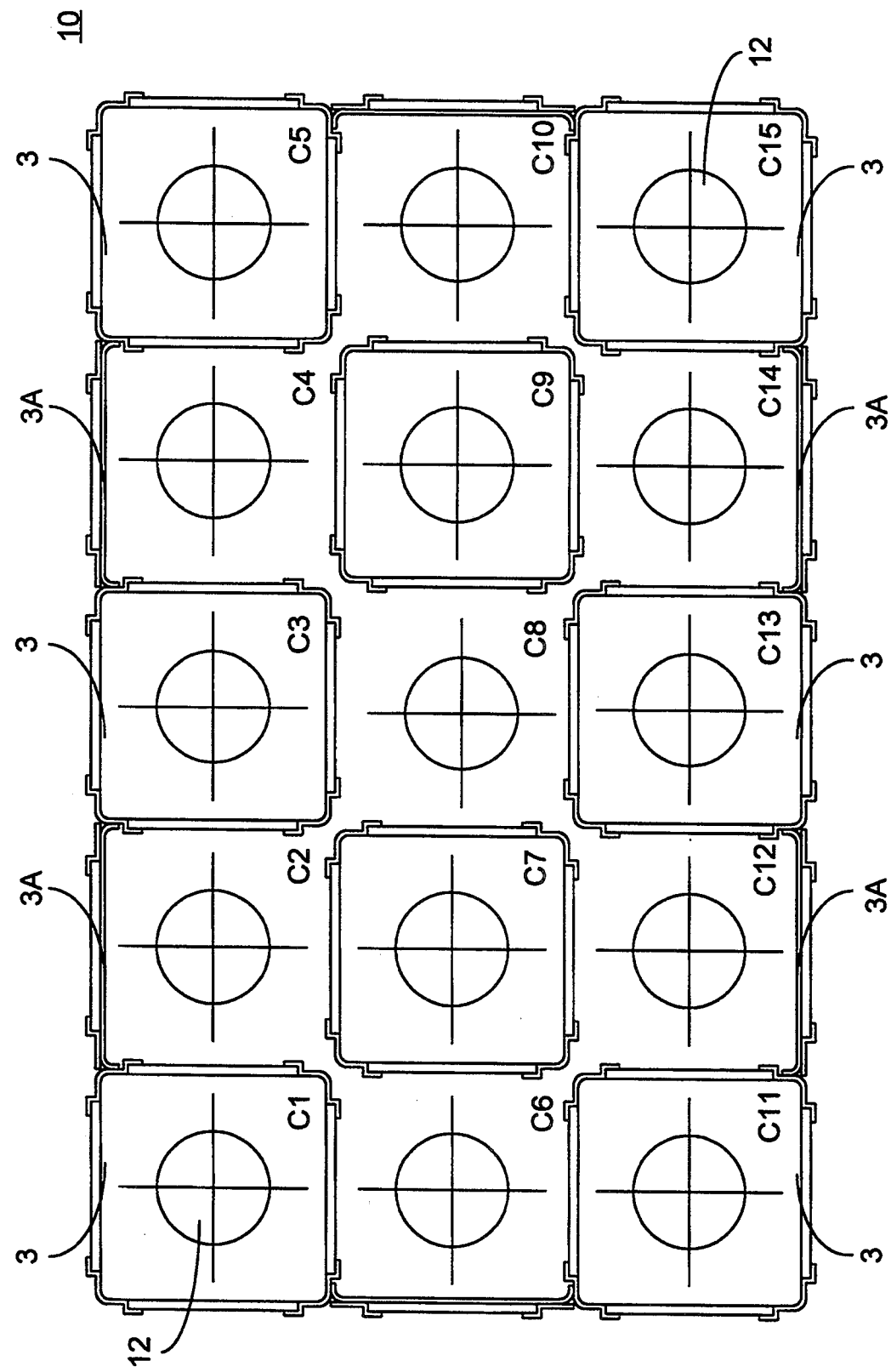
FIG. 1 is a plan view of a storage rack in accordance with the invention, along lines 1—1 of FIG. 2, showing the cell locations with the support bars removed.
Figure 2:
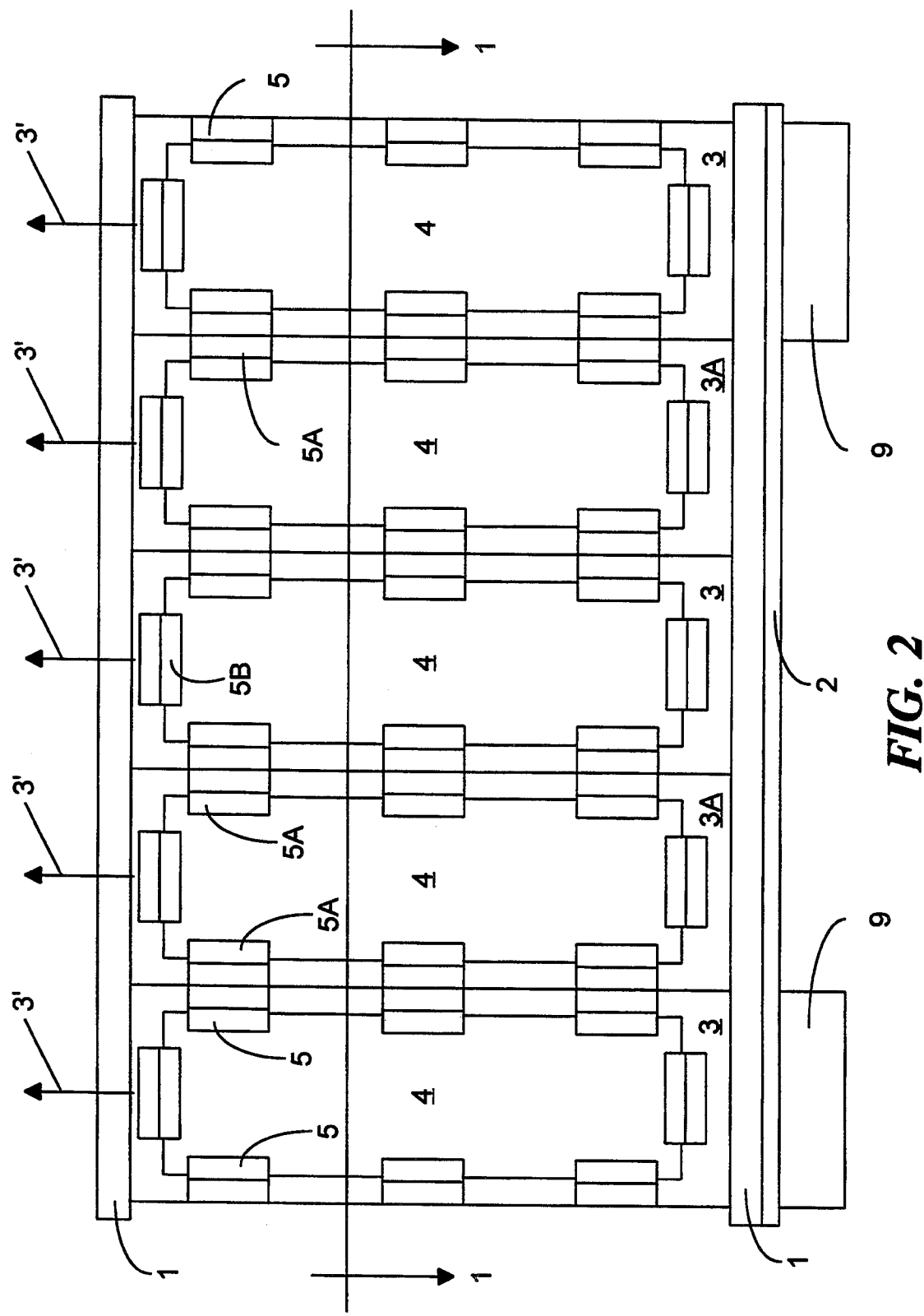
FIG. 2 is an elevation view of the storage rack of FIG. 1.
Figure 3:
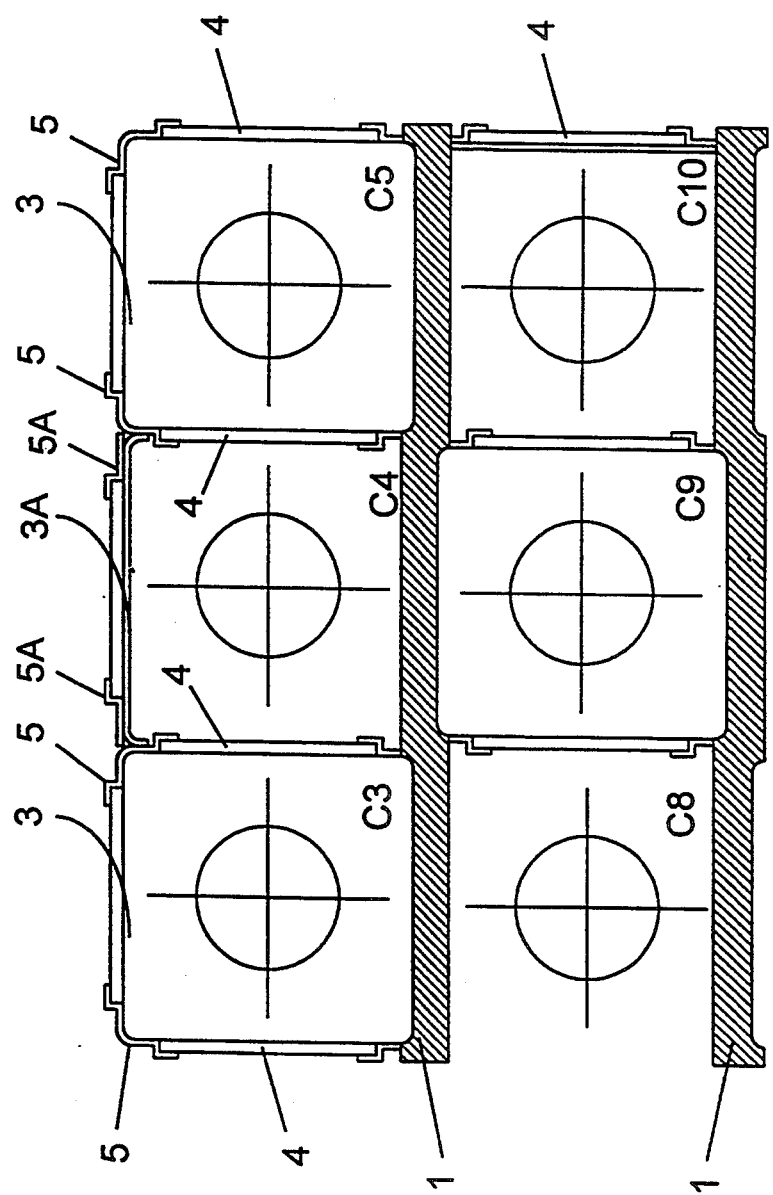
FIG. 3 is a detailed section of the plan view of FIG. 1.

FIGS. 1-5 show a storage rack 10 of the invention, which forms a close packed array 10, 3 rows by 5 columns of elongated cells C1-C15 in this embodiment, the odd numbered or primary cells C1, C3, C5, C7, C9, C11, C13, C15 are formed from rectangular cell housings 3 which extend along housing axes 3'. The even numbered or secondary cells C2, C4, C6, C8, C10, C12, C14 are formed by the walls of the surrounding cells. It is noted that the secondary cells along the perimeter of the array C2, C4, C6, C10, C12, C14 are not completely surrounded by primary cells. If it is necessary that one of these secondary cells is to be utilized, a stiffener wall 3A is inserted substantially flush with exterior walls of the adjacent primary cell housings to completely enclose the secondary cell as shown in FIG. 3.

Figure 5:
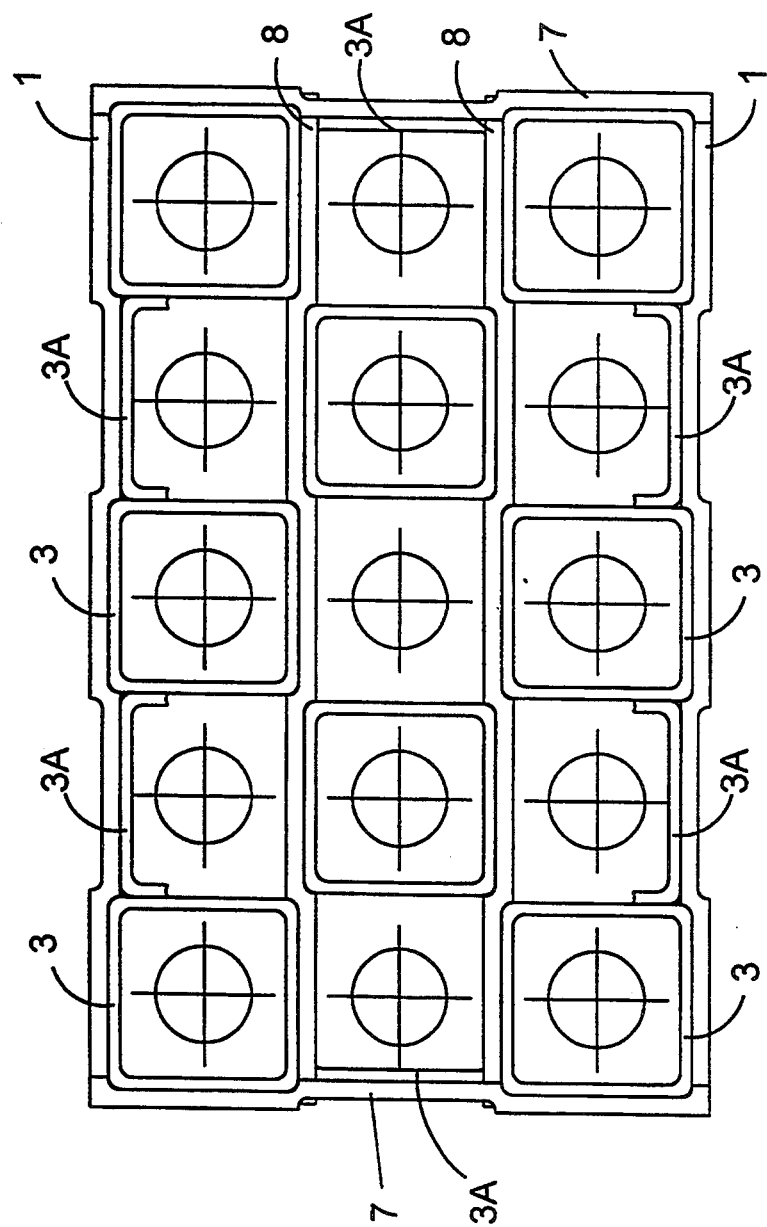
FIG. 5 is a plan view of the storage rack of FIG. 1, showing the cell locations and the support bars.

The individual cell housings 3 and the stiffener walls 3A are held in parallel alignment by upper and lower support bars 1, 7, and 8 which extend transverse to the longitudinal axis of the cell housings 3. The support bars 1, 7 and 8 are located between each of the rows of cells and along the perimeter of the array as shown in FIG. 5. Support bars 1, 7 and 8 are provided at both the top and bottom end portions of the rack. The cell housings are held in parallel alignment by welding the individual cell housings 3 to the upper and lower support bars 1, 7 and 8. The support bars also add strength to the upper and lower ends of the cell housings to resist damage during inserting and removal of the nuclear fuel rod assemblies.

As shown in FIG. 2, a base plate 2 is welded to the bottom of the rack to close the bottom of the cells and support the nuclear fuel assemblies. The base plate 2 may also be provided with holes 12 at locations within each cell and pedestal feet 9 to facilitate the flow of water for enhanced cooling.

Each cell housing 3 is an elongated tube having a rectangular cross section. The housing is constructed from suitable material, for example, .050 inch thick stainless steel tubing. Typically the tubes are square, approximately 8½ inches along each side and 14 feet long. Each outer surface of the housing is planar, to which is applied, with a preload force, an elongated slab 4 constructed of a damping material. The damping material may also be a neutron absorbing material, such as borated stainless steel, borated aluminum, boral (such as manufactured by Brooks & Perkins, Minneapolis, Minnesota), or other neutron absorbing materials may be used. The damping material is preloaded against the outer surface by retainer clips 5, 5A, 5B which are welded to the outside of the housings along the perimeter of each surface. The retainer clips 5, 5A, 5B are composed from a flat plate of steel by forming an S-shaped bend which causes the plane of the raised edge portion 5C to be offset relative to the fixed edge portion 5D of the same surface. Preferably, the offset is the same size as the thickness of the slab 4. When retainer clips 5, 5A, 5B are plug or spot welded the housing 3, the weld shrinks and the clips are pulled tight against the housing thus preloading the elongated slab against the housing. The fixed edge portion 5D may be provided with holes to facilitate plug welding. Alternatively, the offset 5E may be less than the thickness of the damping material and therefore, when the fixed edge portion 5D is fixed to the housing 3, the raised edge portion 5C forces the damping material 4 against the outer surface of the housing. In this embodiment, the retainer clips may be fixed by welding as well as by rivets or threaded fasteners.

Figure 4:
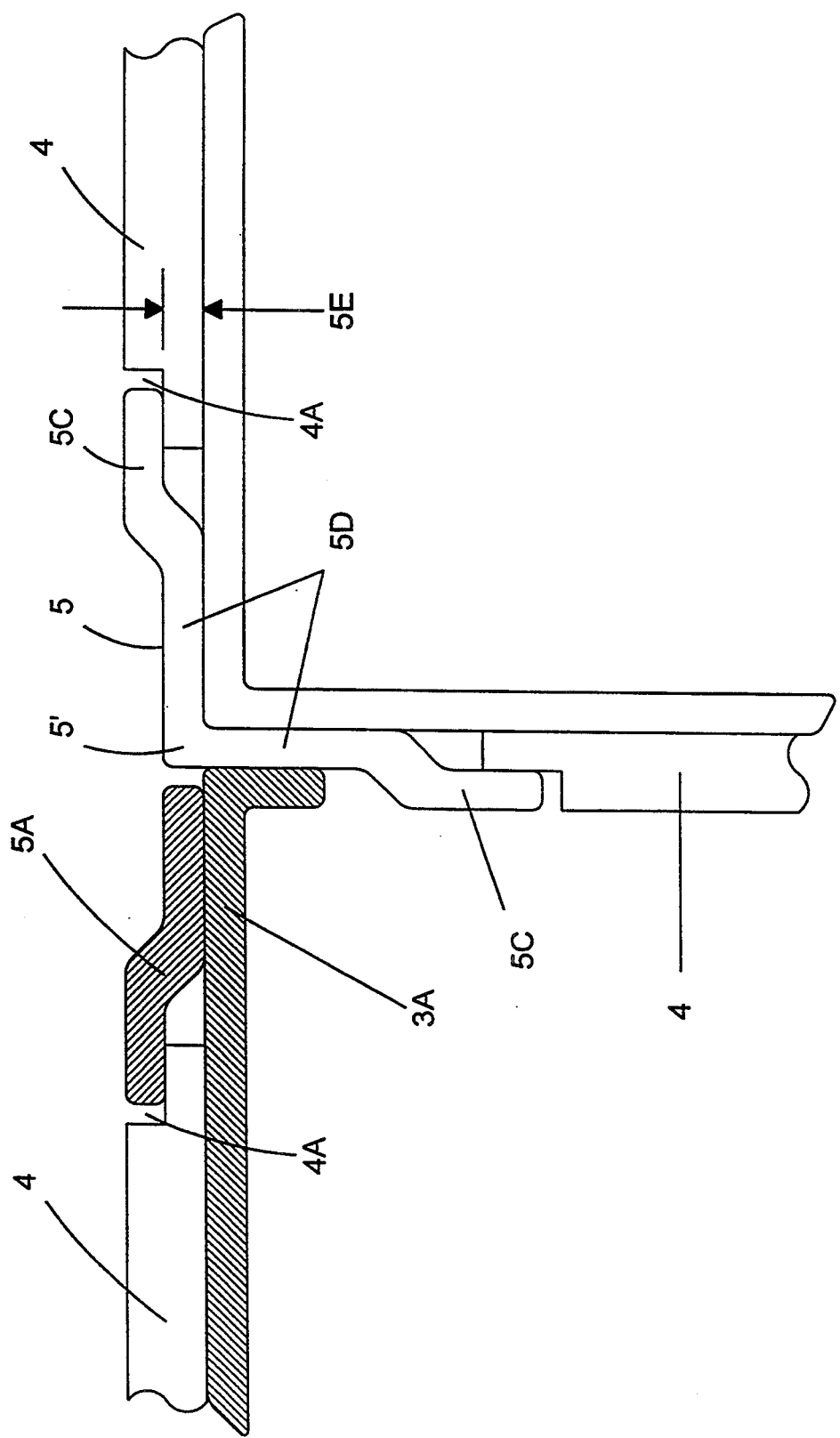
FIG. 4 is a detailed view of an perimeter cell of the rack of FIG. 1, showing the stiffener wall and retainer clips.

As shown in FIG. 2, there are upper and lower horizontal retainer clips 5B attached at the upper and lower ends of each lateral surface of the cell housings. Also shown are vertical retainer clips 5 which are attached to the housings 3 along the vertical edges of the outer surfaces. As shown in FIG. 4, the vertical retainer clip 5 has a right angle bend 5' along its center and raised edge portions 5C on each side of the bend. This permits the vertical retainer clip 5 to preload the damping material on two adjacent surfaces of the housings 3.

As shown in FIG. 4, the slabs 4 may be provided with recesses 4A along each edge. The depth of the recess 4A is preferably equal to the thickness of the retainer clip 5. The recess 4A permits the retainer clips 5 to be flush with the outer surface of the slab 4. This avoids damaging the retainer clips 5 during insertion and removal of the fuel assemblies.

As shown in FIGS. 3 and 4, a stiffener wall 3A may be utilized to enclose the secondary cells (e.g., cell C4) along the perimeter of the array 10. The stiffener wall 3A is a U-shaped channel of the same material, length and thickness as the cell housing. It is of sufficient width to fill the space between two primary cells (e.g., cells C3 and C5). The outer surface of the stiffener wall 3A may have a damping slab 4 preloaded against it made of a material of a similar size and type of material preloaded against the walls of the cell housings 3. The slab 4 of damping material is preferably preloaded against the outer surface of the stiffener wall by horizontal retainer clips 5A along the upper and lower ends of the stiffener wall 3A and by vertical retainer clips 5B along the longitudinal edges of the stiffener wall 3A.

Figure 6:
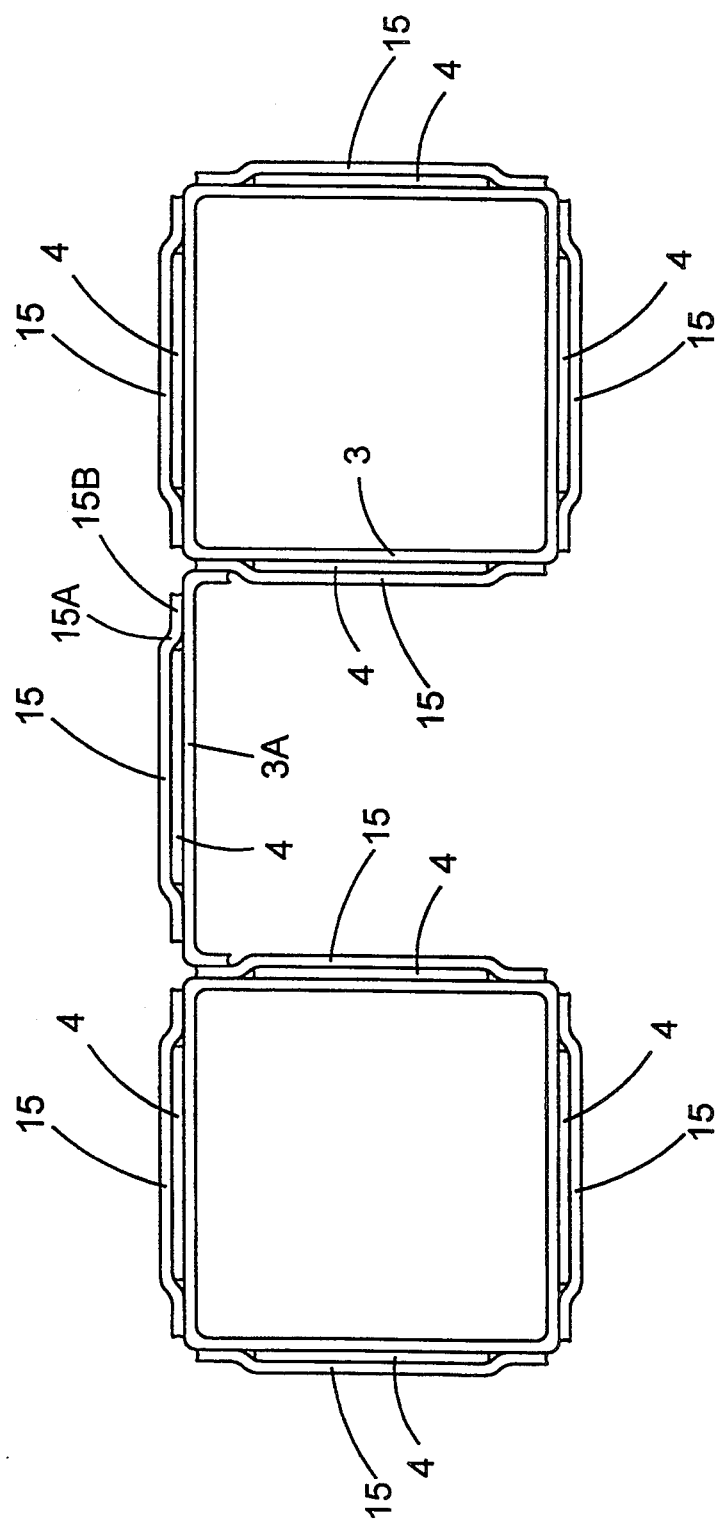
FIG. 6 is a plan view of an alternative embodiment of the invention showing the cover plate retaining device.
Figure 7:
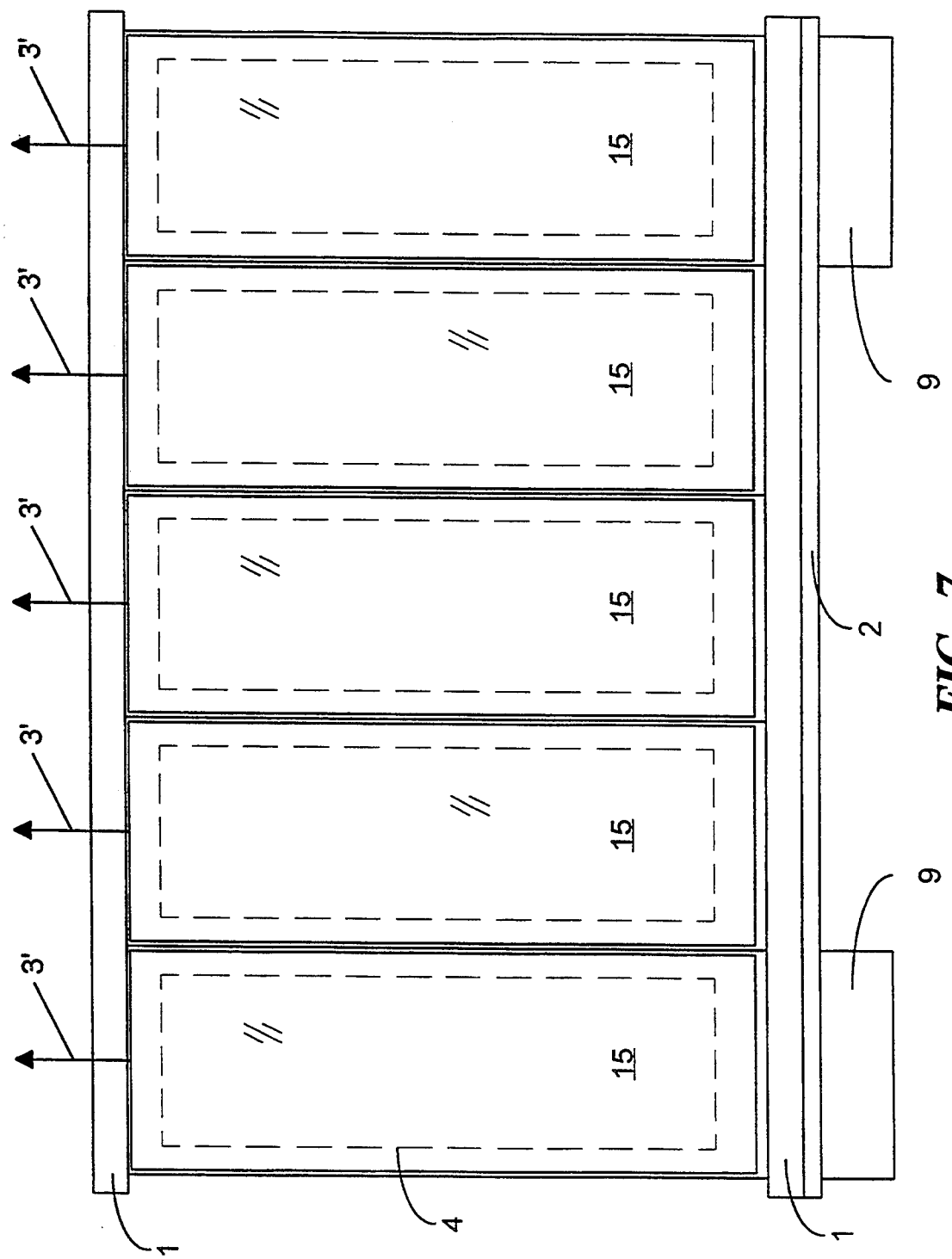
FIG. 7 is an elevation view of an alternative embodiment of the invention showing the cover plate retaining device.

In an alternate embodiment as shown in FIGS. 6 and 7, the retaining device is a cover plate 15 which extends over the entire housing surface. The cover plate 15 has a flange extending from each edge which is fixed to the housing 4. Each flange has a S-shaped bend which includes a sloped portion 15A and fixed portion 15B. After the fixed portion 15B is welded to the housing, the resulting weld shrinkage causes the sloped portion 15A to pull the cover plate 15 against the housing thus preloading the poison slab 4 against the outer surface.

Figure 8:
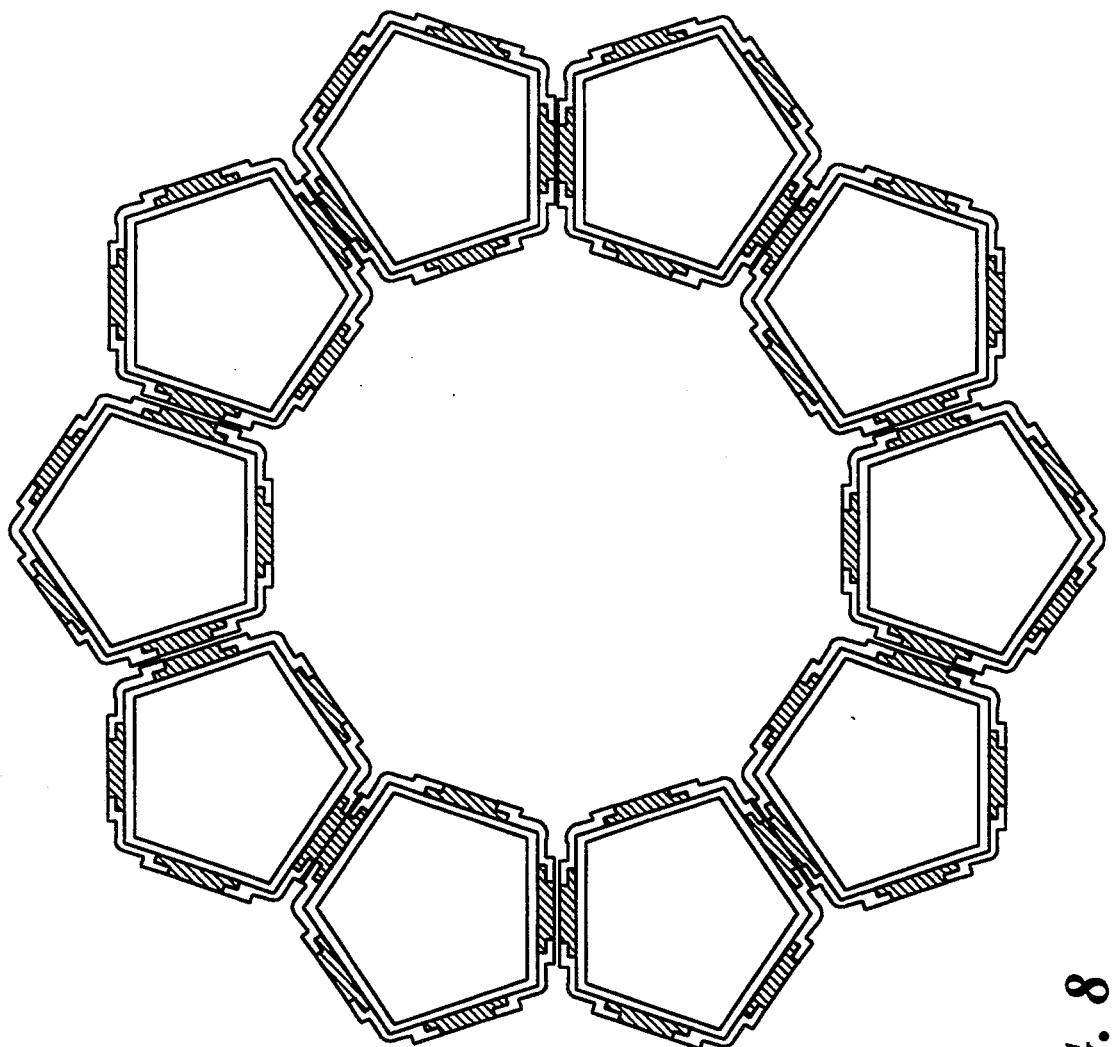
FIG. 8 is a plan view of an alternate embodiment of the invention showing cell housings having a pentagonal cross-section.
Figure 9:
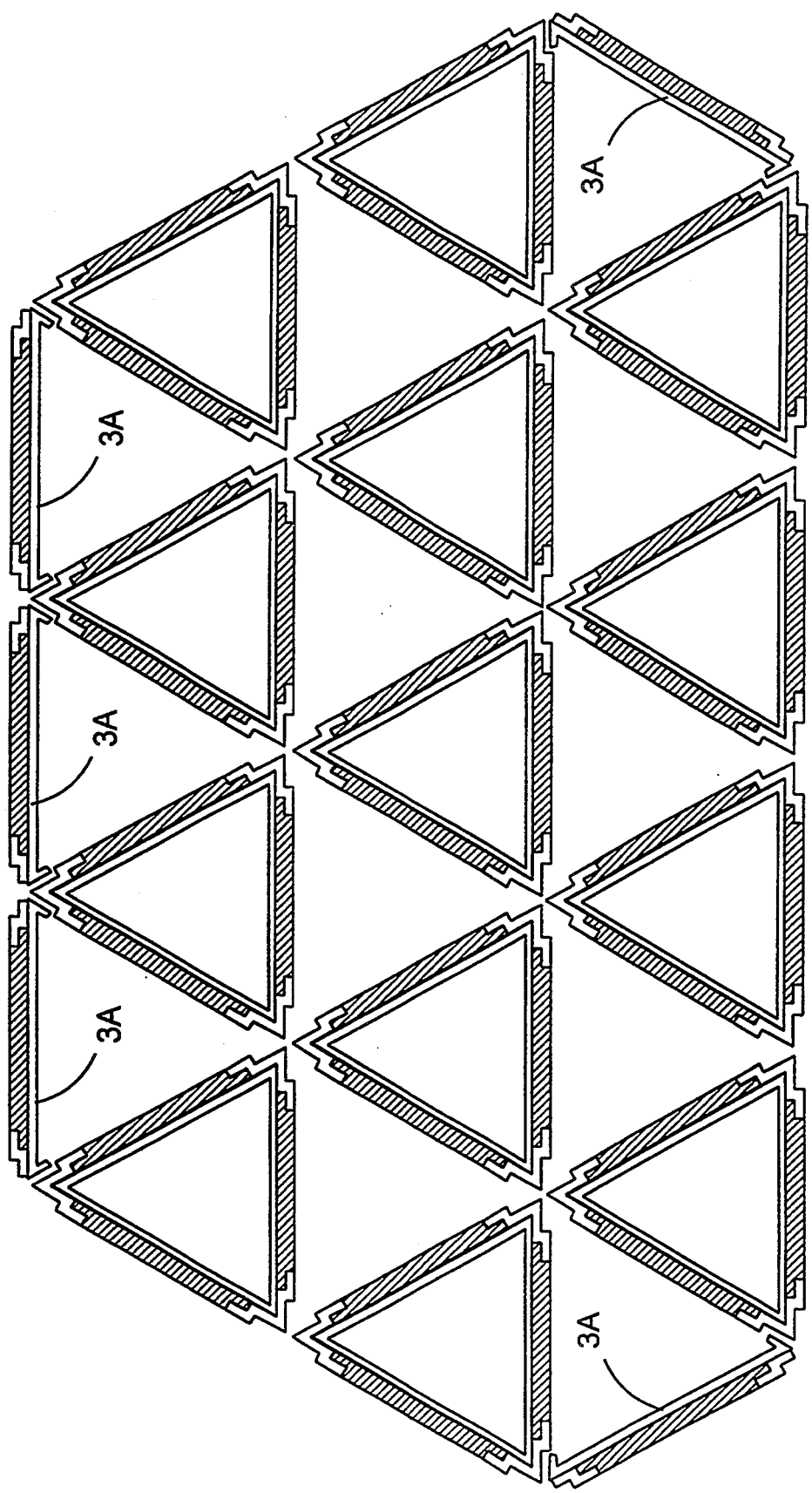
FIG. 9 is a plan view of an alternate embodiment of the invention showing cell housings having a triangular cross-section.
Figure 10:
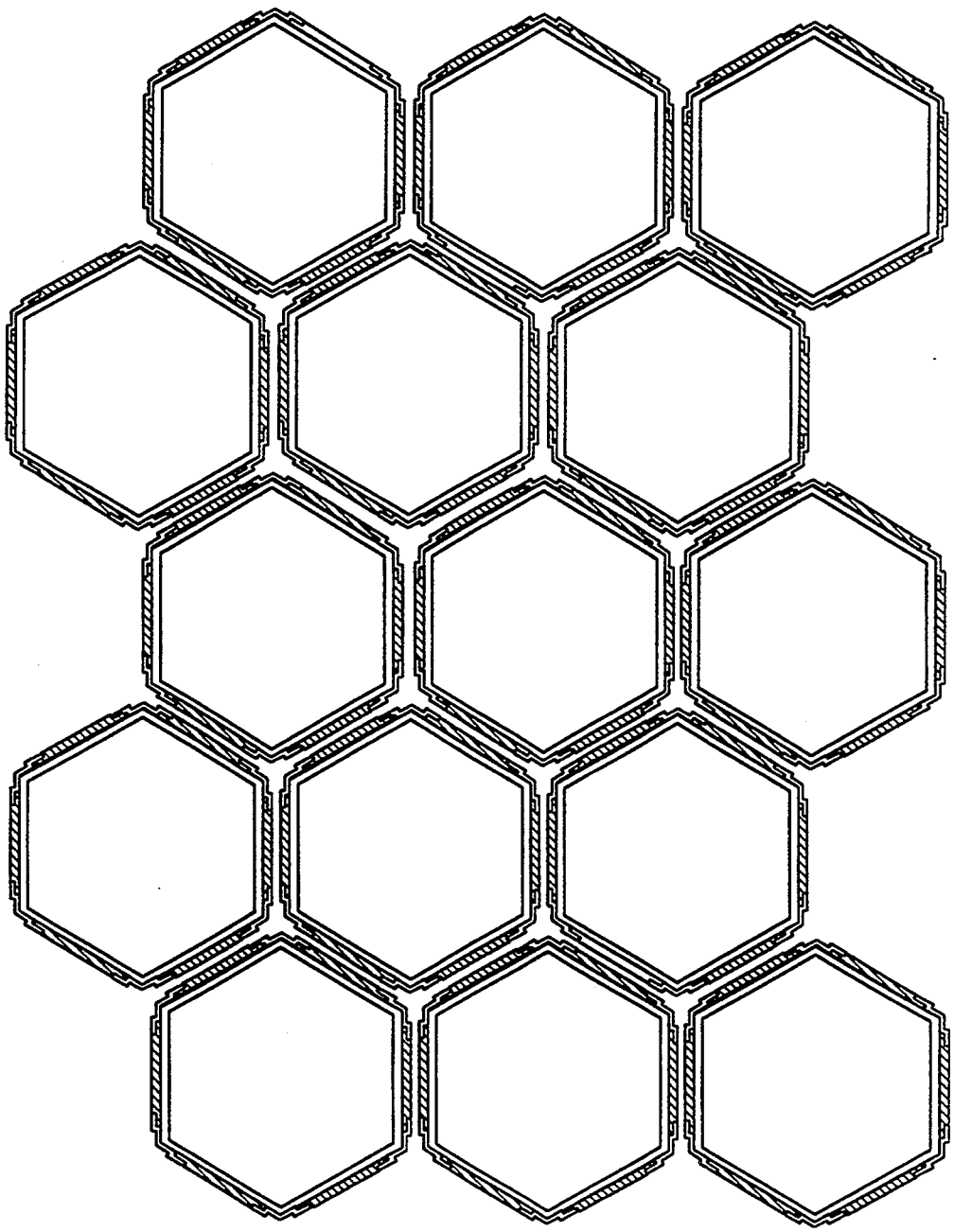
FIG. 10 is a plan view of an alternate embodiment of the invention showing cell housings having a hexagonal cross-section.
Figure 11:
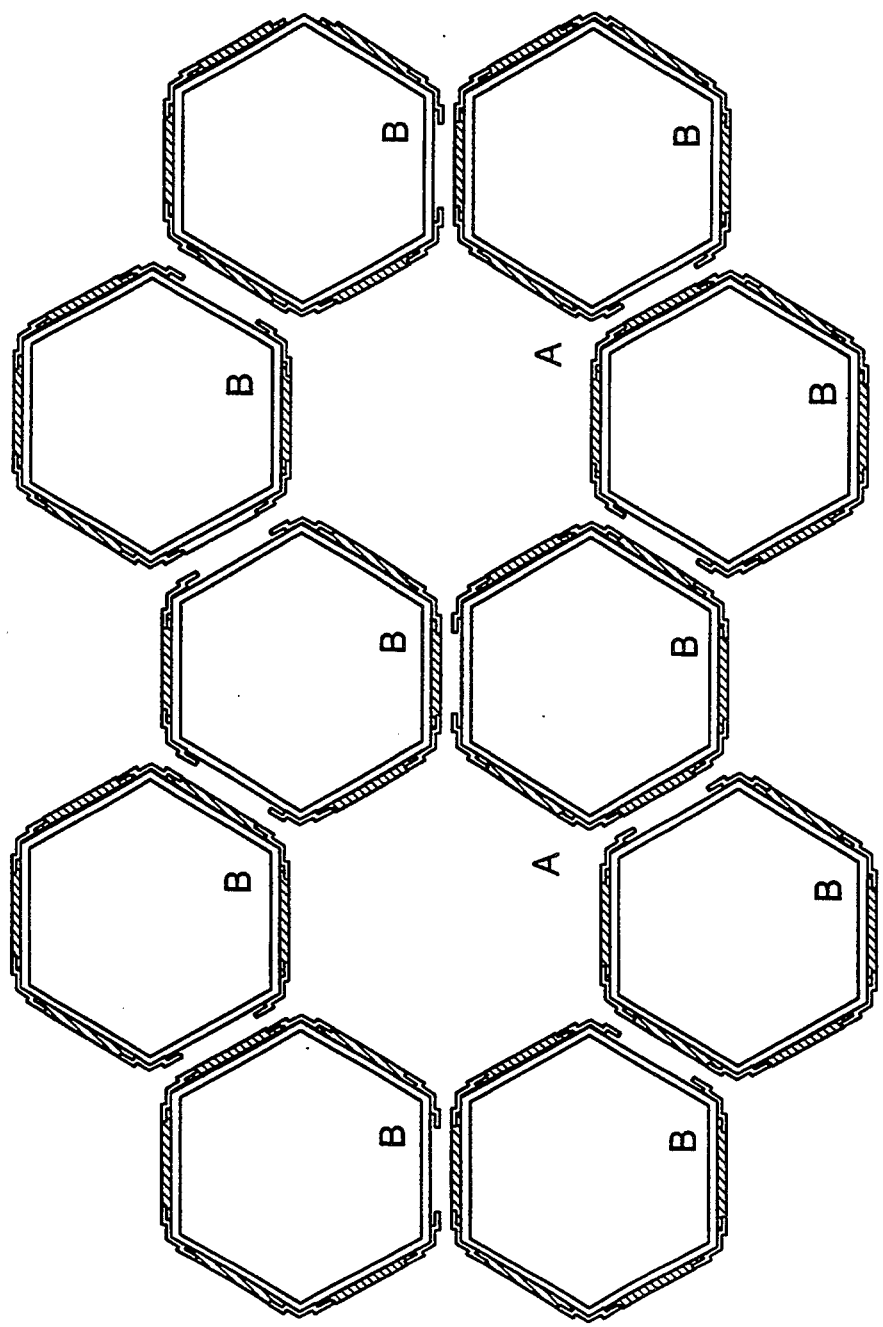
FIG. 11 is a plan view of the alternate embodiment of the invention shown in FIG. 10 wherein specific cell positions are formed by adjacent cells. The spacing between the cells has been exaggerated for clarity.

As shown in FIGS. 8-11, the invention may be embodied utilizing cells having different geometric cross-sections. By utilizing different cell geometries, the packing or spacing of nuclear fuel assemblies can be controlled to accommodate different system requirements. FIG. 8 shows an embodiment of the present invention utilizing cells of pentagonal cross-section. While the cells are shown in a circular array configuration, the cells may be arranged in other geometric or non-geometric configurations. FIGS. 9-11 show exemplary close packed arrays. FIG. 9 shows an embodiment of the present invention utilizing cells of triangular cross-section. In this embodiment, stiffener walls to enclose the outer cells 3A may also be provided. FIG. 10 shows an embodiment of the present invention utilizing cells of hexagonal cross-section. This configuration provides increased packing of the nuclear fuel assemblies and increased cell strength over rectangular configurations. FIG. 11 shows a modification of the embodiment of FIG. 10 wherein central cells A are formed by the walls of the adjacent surrounding cells B.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A storage container for storing at least one nuclear fuel assembly comprising:
    a tubular housing having at least one substantially planar exterior surface;
    at least one damping slab, having at least one substantially planar surface and at least one peripheral edge bounding said at least one substantially planar surface, and
    retaining means for supporting said damping slab with said substantially planar surface of said damping slab adjacent to said exterior surface of said tubular housing, and for preloading said damping slab against said exterior surface,
    said retaining means having at least one fixed portion and at least one free end extending from said fixed portion, said fixed portion being securely least one exterior surface, and said free end overlying said damping slab adjacent said peripheral edge and preloading said damping slab against said exterior surface.

2. A storage container according to claim 1 wherein said damping slab comprises a neutron-absorbing material.

3. A storage container according to claim 1 wherein said damping includes means for effecting coulomb damping of vibration in said housing.

4. A storage container according to claim 1 wherein said damping slab further comprises stiffening means for reinforcing said tubular housing, 5. A storage container according to claim 1 wherein said damping slab extends substantially over the entirety said substantially planar surface.

6. A storage container according to claim 1 wherein:
    said damping slab includes top and bottom opposing edges and said retaining means are located adjacent said top and bottom opposing edges.

7. A storage container according to claim 1 wherein:
    said damping means includes two opposing lateral side edges and said retaining means are located adjacent both of said lateral side edges.

8. A storage container according to claim 1 wherein:
    said damping slab includes top and bottom opposing edges and two opposing lateral side edges, and
    said retaining means are located adjacent said top and bottom opposing edges and said lateral side edges.

9. A storage container according to claim 1 wherein:
    said retaining means include a plurality of elongated clip elements, each elongated clip element having an elongated free end and an elongated fixed portion.

10. A storage container according to claim 9 wherein:
    said elongated clip element comprises a polygonal shaped plate having an S-shaped bend forming said free end and said fixed portion,
    said fixed portion extending from one side of said S-shaped bend along a first plane, and
    said free end extending from an opposite side of said S-shaped bend along a second plane offset from and substantially parallel to said first plane.

11. A storage container according to claim 1 wherein:

said retaining means include a plurality of elongated clip elements, each elongated clip element having an elongated fixed portion, a first elongated free end extending from one side of said elongated fixed portion and a second elongated free end extending from an opposite side of said elongated fixed portion.

12. A storage container according to claim 11 wherein:
said elongated clip element comprises a polygonal shaped plate having two S-shaped bends forming said first elongated free end, said second elongated free end and said fixed portion,
said fixed portion extending from one side of a first S-shaped bend along a first plane to one side of a second S-shaped bend, and
said first elongated free end extending from an opposite side of said first S-shaped bend along a second plane offset from and substantially parallel to said first plane, and
said second elongated free end extending from an opposite side of said second S-shaped bend along said second plane offset from and substantially parallel to said first plane.

13. A storage container according to claim 11 wherein:
said elongated clip element comprises a polygonal shaped plate having two S-shaped bends forming said first elongated free end, said second elongated free end and said fixed portion,
said fixed portion including a substantially right angle bend, said fixed portion extending from one side of a first S-shaped bend along a first plane to said right angle bend along a second plane substantially perpendicular to said first plane and extending to one side of a second S-shaped bend, and
said first elongated free end extending from an opposite side of said first S-shaped bend along a third plane offset from and substantially parallel to said first plane, and
said second elongated free end extending from an opposite side of said second S-shaped bend along a forth plane offset from and substantially parallel to said second plane.

14. A storage rack for storing nuclear fuel assemblies comprising:
an array of storage compartments,
each of said storage compartments comprising:
a tubular housing having at least one substantially planar exterior surface,
at least one damping slab, having at least one substantially planar surface and at least one peripheral edge bounding said at least one substantially planar surface, and
retaining means for supposing said damping slab with said substantially planar surface of said damping slab adjacent to said exterior surface of said tubular housing, and for preloading said damping slab against said exterior surface,
said retaining means having at least one fixed portion and at least one free end extending from said fixed portion, said fixed portion being securely fastened to said at least one exterior surface, and said free end overlying said damping slab adjacent said peripheral edge and preloading said damping means against said exterior surface.

15. A storage rack according to claim 10 wherein:
said retaining means is located at discrete positions along the perimeter of said substantially planar surface.

16. A storage rack according to claim 10 wherein:
the storage rack further comprises upper and lower end portions; and
support means for strengthening the upper and lower end portions of the storage rack.

17. A storage rack according to claim 13 wherein:
the support means include recess means for positioning the storage compartments in alignment.

18. A storage rack according to claim 13, wherein:
each storage compartment housing extends along a central axis; and
said support means position each storage compartment to align the central axis thereof in parallel relation with each adjacent storage compartment.

19. A storage rack according to claim 10, wherein:
at least one storage compartment has lateral surfaces defined by exterior surfaces of a plurality of adjacent storage compartments.

20. A storage rack according to claim 10, wherein:
at least one storage compartment is defined by three or more adjacent storage compartments.

21. A compartment for supporting therein an elongated nuclear fuel assembly, comprising:
A. an elongated tubular housing extending along a housing axis and having a polygonal cross-section transverse to said housing axis, said housing having at least three lateral sidewalls, at least one of said sidewalls having a substantially planar exterior surface extending substantially parallel to said housing axis, defining a volume interior to said housing for receiving a nuclear fuel rod,
B. one or more elongated damping elements, each of said damping elements being associated with one of said sidewalls having said substantially planar surface, and each of said damping elements having at least one substantially planar lateral surface extending in the direction of elongation of said damping element, and
C. one or more clamp assemblies including means for biasing each of said damping elements against its associated sidewall with said planar surface of said damping element being adjacent to said planar surface of said sidewall, each said biasing means having at least one fixed portion and at least one free end extending from said fixed portion, said fixed portion being securely fastened to said at least one exterior surface, and said free end overlying said damping slab adjacent said peripheral edge and preloading said damping slab against said exterior surface.

22. A compartment according to claim 21 wherein said housing has four lateral sidewalls which define said interior volume, said interior volume having a substantially square cross-section transverse to said housing axis.

23. A compartment according to claim 21 wherein said housing has three lateral sidewalls which define said interior volume, said interior volume having a substantially triangular cross-section transverse to said housing axis.

24. A compartment according to claim 21 wherein said housing has six lateral sidewalls which define said interior volume, said interior volume having a substantially hexagonal cross-section transverse to said housing axis.

25. A compartment according to claim 18 wherein said clamp assemblies include a plurality of biasing means affixed to said sidewalls at discrete perimeter locations of said damping elements.

26. A compartment according to claim 21 wherein said damping elements are constructed from a neutron absorbing material.

27. A compartment according to claim 26 wherein said neutron absorbing material is selected from the group consisting of borated stainless steel, boral, and borated aluminium.

28. A rack matrix assembly for supporting therein a plurality of elongated nuclear fuel assemblies:
   A. a plurality of compartments, each of said compartments including:
      i. an elongated tubular housing extending along a housing axis and having a polygonal cross-section transverse to said housing axis, said housing having at least three lateral sidewalls, at least one of said sidewalls having a substantially planar exterior surface extending substantially parallel to said housing axis, and said housing having at least one end member extending transverse to and affixed to said housing axis at one end of said housing, said sidewalls and said end member defining a volume interior to said housing for receiving a nuclear fuel rod,
      ii. one or more elongated damping elements, each of said damping elements being associated with one of said sidewalls having said substantially planar surface, and each of said damping elements having at least one substantially planar lateral surface extending in the direction of elongation of said damping element, and
      iii. one or more clamp assemblies including means for biasing each of said damping elements against its associated sidewall with said planar surface of said damping element being adjacent to said planar surface of said sidewall, each said biasing means having at least one fixed portion and free end extending from said fixed portion said fixed portion being securely fastened to said at least one exterior surface, and said free end overlying said damping slab adjacent said peripheral edge and preloading said damping against said exterior surface, and
   B. matrix means for establishing the relative position of said compartments whereby each said housing is fixedly positioned with respect to each other with said housing axes mutually parallel.

29. A rack matrix assembly according to claim 26 wherein said matrix means includes means for positioning each said housing in a close-packed array.

30. A rack matrix assembly according to claim 27 wherein said matrix means includes means for positioning each said housing whereby the lateral sidewalls of three or more of said housings define an elongated volume therebetween having substantially the same polygonal cross-section as said polygonal cross-section of said housing, said elongated volume for receiving a nuclear fuel rod.

31. A rack matrix assembly according to claim 33 wherein said housing has four lateral sidewalls which define said interior volume, said interior volume having a substantially square cross-section transverse to said housing axis.

32. A rack matrix according to claim 29 wherein the lateral sidewalls of four of said housings define said elongated volume.

33. A rack matrix assembly according to claim 30 wherein said housing has three lateral sidewalls which define said interior volume, said interior volume having a substantially triangular cross-section transverse to said housing axis.

34. A rack matrix according to claim 33 wherein the lateral surfaces of three of said housings define said elongated volume.

35. A rack matrix assembly according to claim 30 wherein said housing has six lateral sidewalls which define said interior volume, said interior volume having a substantially hexagonal cross-section transverse to said housing axis.

36. A rack matrix according to claim 35 wherein the lateral surfaces of six of said housings define said elongated volume.

37. A rack matrix assembly according to claim 28 wherein said housing has four lateral sidewalls which define said interior volume, said interior volume having a substantially square cross-section transverse to said housing axis.

38. A rack matrix assembly according to claim 28 wherein said housing has three lateral sidewalls which define said interior volume, said interior volume having a substantially triangular cross-section transverse to said housing axis.

39. A rack matrix assembly according to claim 28 wherein said housing has six lateral sidewalls which define said interior volume, said interior volume having a substantially hexagonal cross-section transverse to said housing axis.

40. A rack matrix according to claim 26 wherein said clamp assemblies include a plurality of biasing means affixed to said sidewalls at discrete perimeter locations of said clamping elements.

41. A rack matrix according to claim 28 wherein said damping elements are constructed from a neutron absorbing material.

42. A rack matrix according to claim 41 wherein said neutron absorbing material is selected from the group consisting of borated stainless steel, boral, and borated aluminium.

* * * * *